US007889058B2

(12) United States Patent
Suga et al.

(10) Patent No.: US 7,889,058 B2
(45) Date of Patent: Feb. 15, 2011

(54) RADIO-TAG READING SYSTEM, RADIO-TAG READER, AND RADIO TAG

(75) Inventors: Hiroyoshi Suga, Tokyo (JP); Yukimasa Nagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1035 days.

(21) Appl. No.: 11/631,677

(22) PCT Filed: Jul. 29, 2004

(86) PCT No.: PCT/JP2004/010813

§ 371 (c)(1),
(2), (4) Date: Jan. 5, 2007

(87) PCT Pub. No.: WO2006/011207

PCT Pub. Date: Feb. 2, 2006

(65) Prior Publication Data

US 2008/0088414 A1    Apr. 17, 2008

(51) Int. Cl.
*H04Q 5/22* (2006.01)
(52) U.S. Cl. ............... 340/10.2; 340/10.5; 340/10.51
(58) Field of Classification Search ...... 340/10.1–10.6, 340/572.1, 825.54, 582.2
See application file for complete search history.

(56) References Cited

U.S. PATENT DOCUMENTS

| 4,805,196 | A | * | 2/1989 | Cooperman et al. ......... 375/356 |
|---|---|---|---|---|
| 4,931,788 | A | * | 6/1990 | Creswick ................. 340/10.33 |
| 5,008,661 | A | * | 4/1991 | Raj ........................ 340/10.51 |
| 5,150,114 | A | * | 9/1992 | Johansson ................. 340/10.5 |
| 5,307,349 | A | * | 4/1994 | Shloss et al. ................ 370/442 |
| 5,453,747 | A | * | 9/1995 | D'Hont et al. ................ 342/42 |
| 5,546,411 | A | * | 8/1996 | Leitch et al. ................. 714/708 |
| 5,673,037 | A | * | 9/1997 | Cesar et al. ............... 340/10.32 |
| 6,079,619 | A | * | 6/2000 | Teraura et al. .............. 235/380 |
| 6,104,279 | A | * | 8/2000 | Maletsky ................. 340/10.41 |
| 6,150,934 | A | * | 11/2000 | Stiglic ........................ 340/505 |
| 6,362,737 | B1 | * | 3/2002 | Rodgers et al. ........... 340/572.1 |
| 6,480,143 | B1 | * | 11/2002 | Kruger et al. ................. 342/44 |
| 6,535,109 | B1 | * | 3/2003 | Mahdavi .................... 340/10.3 |
| 6,538,563 | B1 | * | 3/2003 | Heng ........................ 340/10.2 |
| 6,563,417 | B1 | * | 5/2003 | Shaw ........................ 340/10.1 |
| 6,566,997 | B1 | * | 5/2003 | Bradin ...................... 340/10.2 |

(Continued)

FOREIGN PATENT DOCUMENTS

EP        0 779 520 A2    6/1997

(Continued)

*Primary Examiner*—Benjamin C Lee
*Assistant Examiner*—Quang Pham
(74) *Attorney, Agent, or Firm*—Birch, Stewart, Kolasch & Birch, LLP (57) ABSTRACT

The radio-tag reading system includes a radio-tag reader and a radio tag storing therein radio tag information. In the radio-tag reader, a radio-tag detection processor transmits via the communication unit a search signal at a predetermined time interval, and detects that the radio tag enters into the communication area of the communication unit based on a response signal to the search signal. A radio-tag information communication processor reads the radio tag information from the radio tag upon receiving the response signal from the radio tag. In the radio tag, a response processor transmits, upon receiving a signal from the radio-tag reader, a response signal in response to the signal.

21 Claims, 7 Drawing Sheets

U.S. PATENT DOCUMENTS

| | | | |
|---|---|---|---|
| 6,724,297 B1 | 4/2004 | Vacherand et al. | |
| 6,842,116 B2* | 1/2005 | Hum et al. | 340/573.4 |
| 6,967,563 B2* | 11/2005 | Bormaster | 340/10.31 |
| 7,009,495 B2* | 3/2006 | Hughes et al. | 340/10.2 |
| 7,019,618 B2* | 3/2006 | Pratt et al. | 340/10.2 |
| 7,049,942 B2* | 5/2006 | Gallovich | 340/426.1 |
| 7,088,246 B2* | 8/2006 | Fukuoka | 340/572.5 |
| 7,109,844 B2* | 9/2006 | Taki et al. | 340/10.1 |
| 7,193,504 B2* | 3/2007 | Carrender et al. | 340/10.4 |
| 7,252,241 B2* | 8/2007 | Yamada | 235/492 |
| 7,383,122 B2* | 6/2008 | Yamada et al. | 701/200 |
| 7,511,601 B2* | 3/2009 | Eisenberg et al. | 340/3.51 |
| 2002/0021207 A1 | 2/2002 | Wuidart | |
| 2002/0175806 A1* | 11/2002 | Marneweck et al. | 340/10.33 |
| 2003/0165149 A1* | 9/2003 | Lin | 370/412 |
| 2004/0046642 A1* | 3/2004 | Becker et al. | 340/10.32 |
| 2004/0128012 A1* | 7/2004 | Lin | 700/100 |
| 2004/0140884 A1* | 7/2004 | Gallagher et al. | 340/10.2 |
| 2004/0198222 A1* | 10/2004 | Ertin et al. | 455/41.1 |
| 2004/0257204 A1* | 12/2004 | Liao et al. | 340/10.2 |
| 2006/0017544 A1* | 1/2006 | Tanaka et al. | 340/10.2 |
| 2006/0267772 A1* | 11/2006 | Knadle et al. | 340/572.4 |
| 2007/0040687 A1* | 2/2007 | Reynolds | 340/572.7 |
| 2007/0279194 A1* | 12/2007 | Carrender et al. | 340/10.4 |

FOREIGN PATENT DOCUMENTS

| | | |
|---|---|---|
| EP | 1 338 975 A1 | 8/2003 |
| JP | 2000-011105 A | 1/2000 |
| JP | 2000-91949 A | 3/2000 |
| JP | 2002-073284 A | 3/2002 |
| JP | 2003-327331 A | 11/2003 |
| JP | 2004-158987 A | 6/2004 |
| WO | WO-01/45038 A2 | 6/2001 |

\* cited by examiner

RADIO-TAG READING SYSTEM, RADIO-TAG READER, AND RADIO TAG

TECHNICAL FIELD

The present invention relates to a radio-tag reading system, in which at least one of movement of a radio tag into and out of a predetermined area is detected for smooth start of communication with the radio tag, and a radio-tag reader and a radio tag constituting the system.

BACKGROUND ART

In communication between a radio-tag reader and a radio tag (radio frequency identification (RFID)), it is an important technique to detect that the radio tag enters into an area where the radio-tag reader can perform communication (hereinafter, "communication area") in saving power and reducing unnecessary radio wave discharge of the radio-tag reader. As a conventional technology for detecting the entrance of the radio tag is disclosed an incoming and outgoing product registration processing system that manages incoming and outgoing of a plurality of products loaded on a delivery carrier using radio tags. The incoming and outgoing product registration processing system includes a gate (corresponding to the radio-tag reader) with a blocking unit on a passage of the delivery carrier. When an item attached with a radio tag and the delivery carrier do not satisfy a predetermined condition, the blocking unit is closed, and the result and cause thereof are reported to a deliverer. In the incoming and outgoing product registration processing system, a sensor of the gate optically detects the passage of the delivery carrier through the gate, and, as a result, when the delivery carrier passes through the gate, a process using the radio tag is performed (for example, see Patent Document 1).

Patent Document 1: Japanese Patent Application Laid-open No. 2003-327331

DISCLOSURE OF INVENTION

Problem to be Solved by the Invention

The sensor in the incoming and outgoing product registration processing system described in the Patent Document 1 optically detects the passage of the delivery carrier, and does not perform detection using the radio tag attached to the delivery carrier. Therefore, a detection area in which the sensor can detect the delivery carrier is necessarily the same as the communication area of the radio-tag reader (the gate). In such a system, to expand the communication area of the radio tag and the radio-tag reader by changing the communication frequency band and output, the detection area where the sensor can perform detection also needs to be expanded. The sensor optically detects the delivery carrier, and the diffraction characteristics, etc. of light for detecting the delivery carrier are physically different from those of radio used for the radio tag. Accordingly, it is difficult to form a detection area that matches the communication area. Further, the incoming and outgoing product registration processing system described in the Patent Document 1 needs the sensor that detects the entrance of the delivery carrier into the detection area in addition to a communication unit that communicates with the radio tag, which increases the size of the gate. As a result, there is a limitation in cost reduction and space saving.

On the other hand, a method of sequentially reading a plurality of radio tags according to a slot-aloha system is described in ISO/IEC18000-6: one of the standards for the radio tag. However, it is not specified at which point of time reading of identification (ID), i.e., identification information of the radio tag, is started. Therefore, such a condition that a plurality of radio tags enters the communication area of the radio-tag reader at the same time causes a significant time loss and a decrease in read rate of the radio tags depending on timing to start communication. That is, when the timing to start communication is early, the radio tag is insufficiently charged, resulting in a possibility of reread, which leads to a time loss. On the contrary, when the timing to start communication delays, time for reading decreases, resulting in a possibility that all radio tags cannot be read.

It is therefore an object of the present invention to provide a radio-tag reading system capable of, even when radio tags enter into or exit from the communication area of a radio-tag reader at the same time, steadily matching the detection area of the radio tags with the communication area, thereby enabling smooth start of reading ID of each radio tag entering the communication area, and the radio-tag reader and the radio tag that constitutes the radio-tag reading system.

Means for Solving Problem

To achieve the object mentioned above, according to the present invention, a radio-tag reading system comprises a radio tag that is configured to be attached to an object and stores therein radio tag information being predetermined information on the object, and a radio-tag reader that reads the radio tag information from the radio tag. The radio-tag reader includes a communicating unit that performs radio communication with the radio tag, a radio-tag detecting unit that transmits via the communicating unit a search signal for detecting at least one of movement of the radio tag into and out of a communication area where radio communication is available through the communicating unit at predetermined time intervals, and detects at least one of movement of the radio tag into and out of the communication area based on a response signal to the search signal, and a radio-tag information processing unit that reads the radio tag information from the radio tag upon receiving the response signal from the radio tag. The radio tag includes a responding unit that transmits, upon receiving a signal from the radio-tag reader, a response signal in response to the signal.

Effect of the Invention

According to the present invention, the same unit is used for a sensor that detects a radio tag entering a communication area of the radio-tag reader and the communication unit that communicates with the radio tag. Therefore, the radio-tag detection area of the sensor and the radio-tag communication area of the communication unit are matched, which enables efficient detection of and communication with the radio tag. Moreover, a response signal to a search signal for detecting a radio tag is transmitted by reducing a transmission rate thereof, and response signals from a plurality of radio tags are received pseudo-synchronously by the radio-tag reader. Accordingly, even when many radio tags enter the communication area at the same time, the radio-tag reader can detect the entrance of the radio tags. Furthermore, because a radio tag is read upon detection of the entrance of the radio tag, a significant time loss can be avoided, and also a decrease in the read rate of the radio tag can be suppressed at the time of reading the radio tag.

EXPLANATIONS OF LETTERS OR NUMERALS

1 Radio-tag reading system
2, 2A to 2G Radio tag
3 Radio-tag reader
21, 31 Communication unit
22 Response processor
23 Radio-tag information storage unit
25, 35 Controller
32 Modulator/demodulator
33 Radio-tag detection processor
34 Radio-tag information communication processor
41A to 41F Box
42 Pallet
43 Dolly
50 Communication area

BEST MODE(S) FOR CARRYING OUT THE INVENTION

Exemplary embodiments of a radio-tag reading system, a radio-tag reader, and a radio tag according to the present invention are explained in detail below with reference to the accompanying drawings.

First Embodiment

Figure 1:
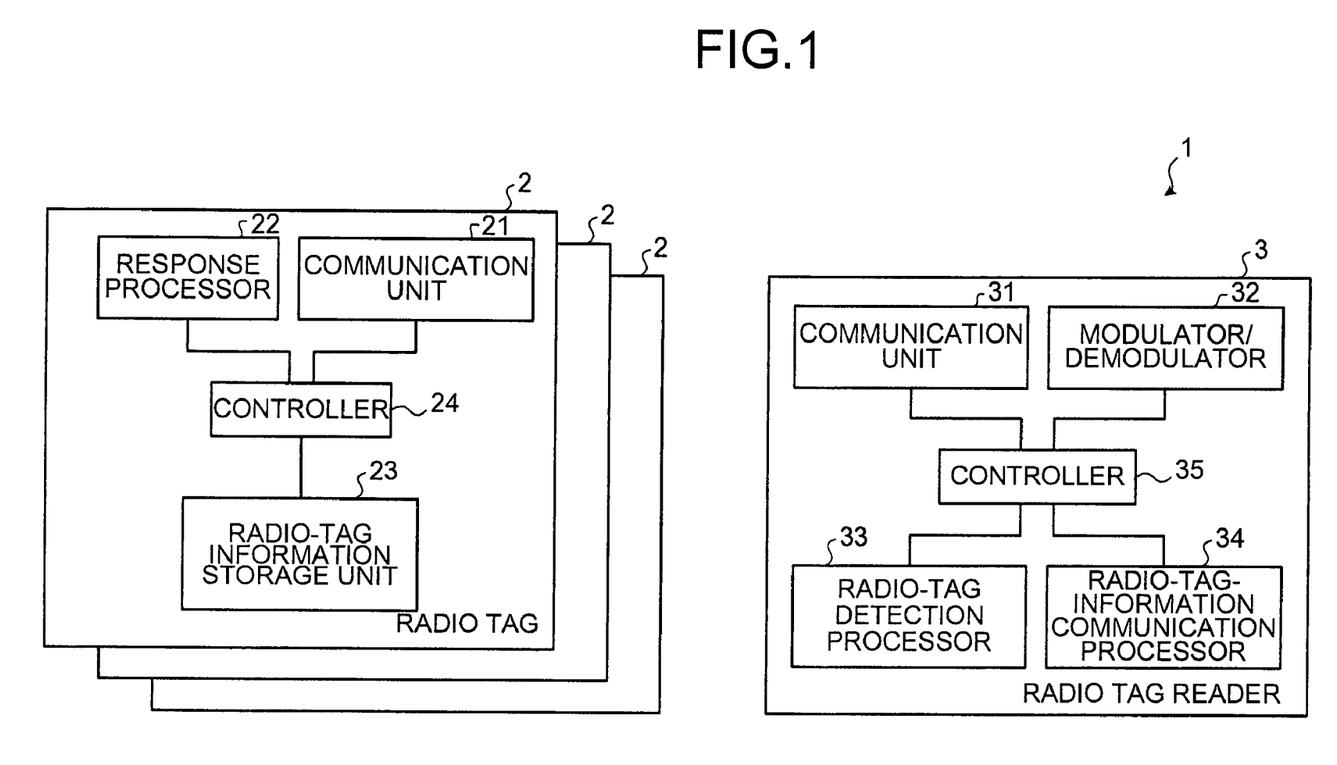
FIG. 1 is a block diagram of a schematic configuration of a radio-tag reading system according to the present invention.

FIG. 1 is a block diagram of a schematic configuration of a radio-tag reading system according to the present invention. A radio-tag reading system 1 includes a radio tag 2, and a radio-tag reader 3 that performs radio communication with the radio tag 2 in a communication area in which radio communication is available with the radio tag 2. The radio tag 2 is attached to an item or a product, and contains radio tag information, i.e., predetermined information on the item.

The radio tag 2 includes a communication unit 21 that performs radio communication with the radio-tag reader 3, a response processor 22 that performs a response process based on a signal from the radio-tag reader 3, a radio-tag information storage unit 23 that stores therein radio tag information, and a controller 24 that controls the respective units. A response processor in the claims corresponds to functions of the communication unit 21 and the response processor 22.

The communication unit 21 converts a message from the response processor 22 to an electric signal, and further converts the electric signal to an electromagnetic wave (radio signal) of a predetermined frequency to send the radio signal. The communication unit 21 also converts a radio signal from the radio-tag reader 3 to an electric signal, and further converts the electric signal to a message to output the message to the response processor 22.

The response processor 22 performs a process corresponding to the content of the signal received from the radio-tag reader 3, and performs read, and when write is possible, performs write with respect to the radio tag information stored in the radio-tag information storage unit 23. Having received a search signal from the radio-tag reader 3, the response processor 22 reduces a transmission rate of a response signal to a search signal based on a field included in a frame of the search signal and transmits the response signal via the communication unit 21. The response processor 22 performs transmission while reducing the transmission rate of only the response signal to the search signal.

The radio-tag information storage unit 23 stores therein identification information such as ID for uniquely identifying the radio tag 2, and radio tag information, which is predetermined information corresponding to a purpose of use of the radio tag 2 relating to an object attached with the radio tag 2.

The radio-tag reader 3 includes a communication unit 31 that communicates with the radio tags 2, a modulator/demodulator 32 that modulates and demodulates a signal transmitted or received by the communication unit 31, a radio-tag detection processor 33 that detects whether there is the radio tag 2 entering the communication area of the radio-tag reader 3, a radio-tag information communication processor 34 that reads identification information (ID) of the radio tag 2 having entered the communication area to perform a predetermined process, and a controller 35 that controls the respective units.

The communication unit 31 converts an electric signal from the modulator/demodulator 32 to an electromagnetic wave (radio signal) of a predetermined frequency and sends the radio signal, and converts a radio signal from the radio tag 2 to an electric signal and outputs the electric signal to the modulator/demodulator 32.

The modulator/demodulator 32 converts a message from the radio-tag detection processor 33 and the radio-tag information communication processor 34 to an electric signal and outputs the electric signal to the communication unit 31, and converts an electric signal output from the communication unit 31 to a message and outputs the message to the radio-tag detection processor 33 and the radio-tag information communication processor 34.

The radio-tag detection processor 33 detects whether the radio tag 2 has entered the communication area, which is determined according to an radio signal output from the communication unit 31. Specifically, the radio-tag detection processor 33 transmits, via the communication unit 31, a frame of a search signal including a field that contains a command to the radio tag 2 having received the search signal to transmit a response signal at a transmission rate reduced by a predetermined percentage at predetermined time intervals. The radio-tag detection processor 33 determines whether the radio tag 2 has entered the communication area based on whether a response signal to the search signal is received from the radio tag 2. The reduction percentage of the transmission rate of the response signal is predetermined at the time of designing the radio-tag reading system 1 including the range of the communication area.

The radio-tag information communication processor 34 reads information stored in the radio tag 2 having entered the communication area when the radio-tag detection processor 33 determines that the radio tag 2 has entered the communication area. The process performed by the radio-tag information communication processor 34 is the same as read and write process generally performed with respect to the radio tag 2, and is not essential features of the present invention, and therefore, the details thereof is not illustrated or described herein.

Figure 2:
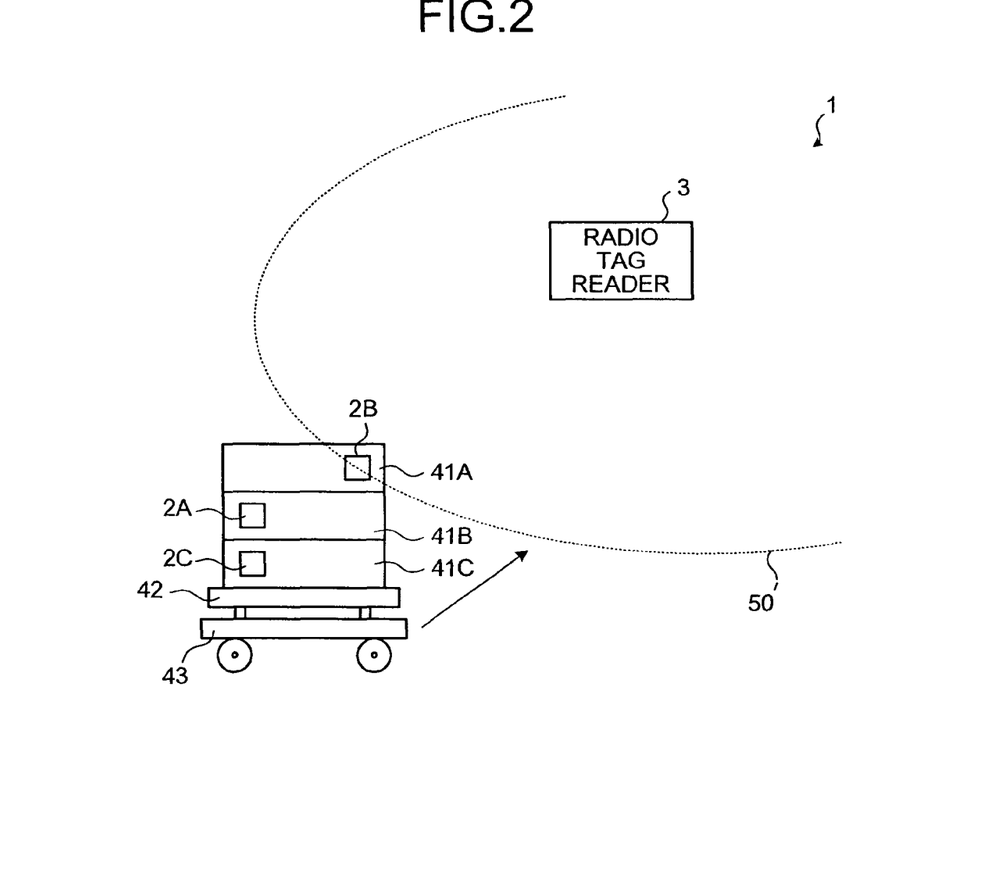
FIG. 2 is a schematic for explaining an example of the application of the radio-tag reading system according to the present invention.

FIG. 2 is a schematic for explaining an example of the application of the radio-tag reading system of the present invention. In the radio-tag reading system, radio tags 2A to 2C are attached to, for example, boxes 41A to 41C for storing items or products. All the boxes 41A to 41C are loaded on a pallet 42, and the pallet 42 is delivered with a dolly 43 to a communication area 50 of the radio-tag reader 3 in a shop. The present invention is favorably applied to manage incoming and outgoing items as shown in FIG. 2. The principle of detection of the entrance of the radio tags 2A to 2C by the radio-tag reader 3 and the operation of the radio-tag reading system 1 are explained with an example in which the radio tags 2A to 2C enter together into the communication area 50 as shown in FIG. 2.

First explained is the principle of detection of the entrance of the radio tags 2A to 2C into the communication area 50 by the radio-tag detection processor 33 in the radio-tag reader 3. The radio-tag detection processor 33 in the radio-tag reader 3 sends a search signal for detecting the radio tags 2A to 2C entering the communication area 50 at predetermined time intervals. One signal is used as the search signal for all the radio tags 2A to 2C, and the response processors 22 of the radio tags 2A to 2C return a predetermined response signal upon receiving the search signal. The response signals have the same waveform regardless of the identification information of the radio tags 2A to 2C. Ideally, upon receiving the search signal from the radio-tag reader 3, the radio tags 2A to 2C send a response signal at the same time in response thereto, and the radio-tag reader 3 receives the response signals simultaneously (synchronously). In other words, the radio-tag detection processor 33 can determine that the radio tags 2A to 2C have entered the communication area 50 by receiving synchronous response signals of a predetermined waveform from the respective radio tags 2A to 2C.

Figure 3:
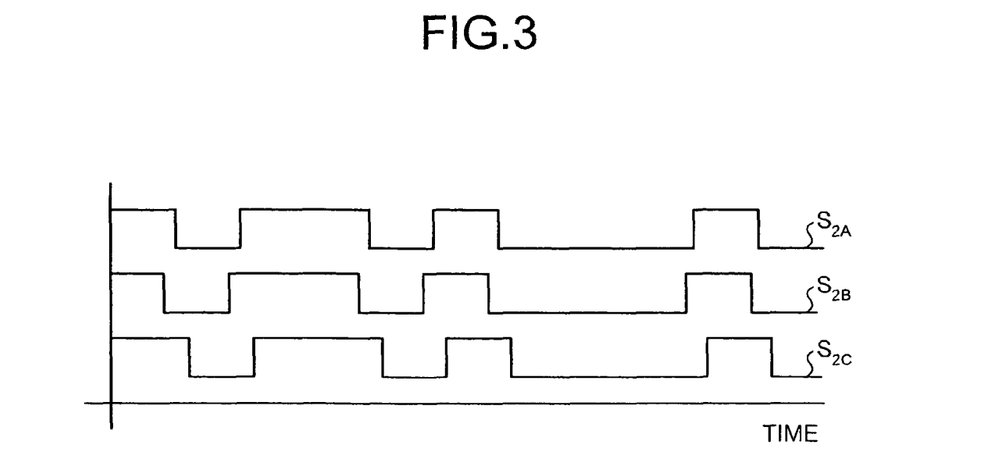
FIG. 3 is a diagram of waveforms of response signals to a search signal from radio tags.

However, in practice, the time when the search signal reaches the respective radio tags 2A to 2C varies due to a difference in radio wave propagation route. Accordingly, the time when response signals from the radio tags 2A to 2C reach the radio-tag reader 3 also varies. FIG. 3 is a diagram of waveforms of the response signals from the radio tags to the search signal. In FIG. 3, horizontal axis indicates time, and vertical axis indicates signal level of the response signal. FIG. 3 depicts, as an example, waveforms of response signals $S_{2A}$ to $S_{2C}$ of the three radio tags 2A to 2C attached to the boxes 41A to 41C at different positions of the pallet 42 shown in FIG. 2. As shown in FIG. 3, when the communication unit 31 in the radio-tag reader 3 receives response signals from the radio tags 2A to 2C at different times, the response signals $S_{2A}$ to $S_{2C}$ from the radio tags 2A to 2C are synchronized. Consequently, the waveforms thereof are deviated from the waveforms of response signals that can be recognized by the radio-tag detection processor 33, and the radio-tag detection processor 33 cannot receive the response signals.

Therefore, in a first embodiment of the present invention, the radio-tag detection processor 33 transmits a frame of a search signal including, in a field, a command to reduce the transmission rate of the response signal. According to this command, the response processor 22 reduces the transmission rate of the response signal in the radio tags 2A to 2C having received the search signal, resulting in a lower jitter rate. Thus, the response signals from the respective radio tags 2A to 2C are pseudo-synchronized. In other words, by reducing the influence of jitter on the radio-tag reader 3, which is a reception side of the response signal, to increase an overlapping portion of the response signals at the same signal level from the respective radio tags 2A to 2C, the communication unit 31 receives response signals pseudo-synchronized, and the modulator/demodulator 32 demodulates the response signals. Thus, the radio-tag detection processor 33 can recognizes the response signals. As just described, the transmission rate of only the response signal is controlled to be reduced, and thereby the radio-tag reader 3 can receive the response signals from the radio tags 2A to 2C simultaneously. Based on the response signals, it is determined whether the radio tags 2A to 2C have entered the communication area 50.

Figure 4:
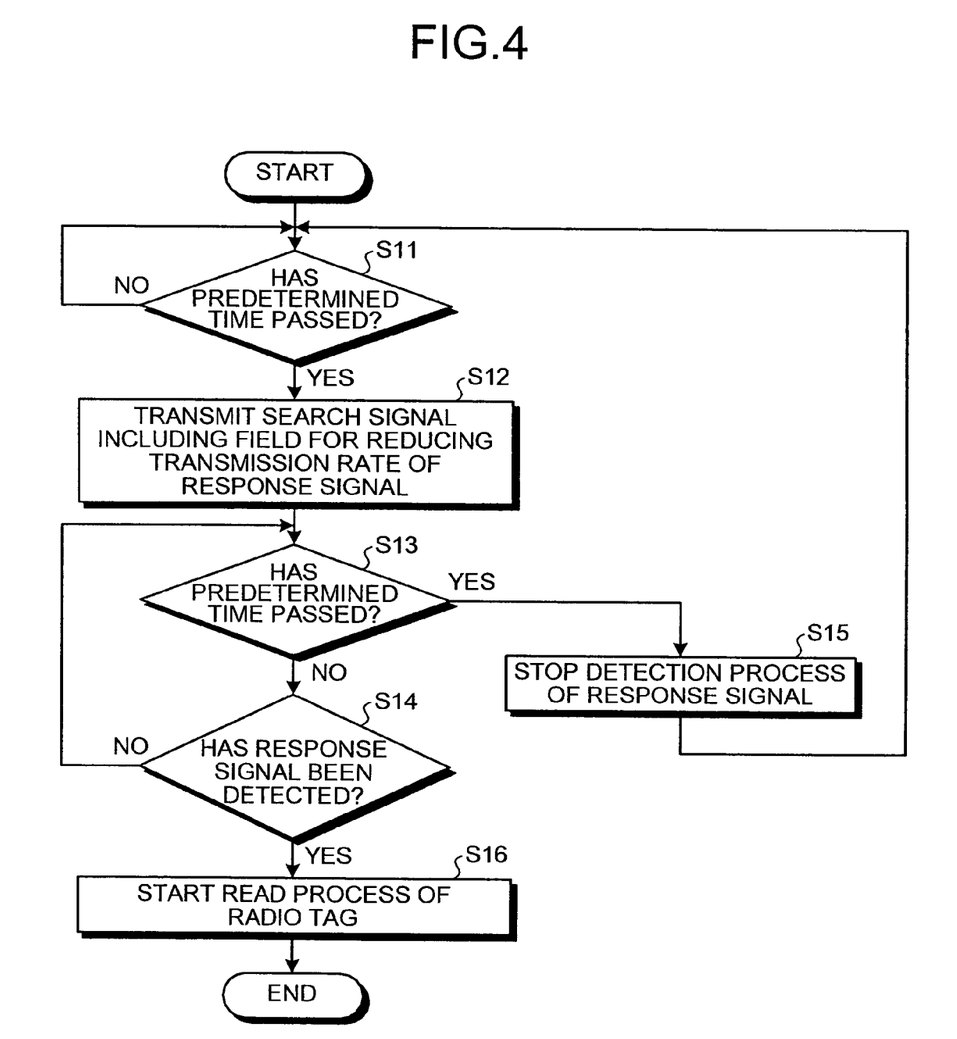
FIG. 4 is a flowchart of a radio-tag approach detection process in the radio-tag reading system.

The operation of the radio-tag reading system 1 according to the present invention is explained next. FIG. 4 is a flowchart of a radio-tag approach detection process in the radio-tag reading system. When the detection process is started by the radio-tag reader 3, the radio-tag detection processor 33 first determines whether a predetermined time has passed (step S11). If the predetermined time has not passed (No at step S11), the radio-tag detection processor 33 enters standby mode. When the predetermined time has passed (Yes at step S11), the radio-tag detection processor 33 transmits a search signal including a field for reducing the transmission rate of a response signal from the radio tag (step S12). The predetermined time is arbitrary set at the time of designing the radio-tag reading system 1.

Thereafter, the radio-tag detection processor 33 determines whether a predetermined time has passed since the transmission of the search signal (step S13). The predetermined time is determined according to the time until the radio tags 2A to 2C respond to the transmitted search signal. If the predetermined time has not passed since the transmission of the search signal (No at step S13), the radio-tag detection processor 33 determines whether response signals from the radio tags 2A to 2C have been detected via the communication unit 31 (step S14). When the response signals from the radio tags 2A to 2C have been detected until the predetermined has passed (Yes at step S14), the radio-tag detection processor 33 determines that the radio tags 2A to 2C have entered the communication area 50. The radio-tag information communication processor 34 starts reading the radio tags 2A to 2C (step S16), and the approach detection process ends with respect to the radio tags 2A to 2C. The radio tags are read in a known manner at step S16, and therefore, the details thereof is not illustrated or described herein. If the response signals from the radio tags 2A to 2C have not been detected until the predetermined has passed since the transmission of the search signal (No at step S14), the process returns to step S13, and the detection of the response signals is performed until the predetermined time has passed.

On the other hand, when the predetermined time has passed since the transmission of the search signal (Yes at step S13), the radio-tag detection processor 33 determines that the radio tags 2A to 2C have not entered the communication area 50, and terminates the detection of the response signals (step S15). The process returns to step S11 to repeat the above process.

In the first embodiment, a case that the radio tags 2A to 2C enter the communication area 50 is explained. However, the exit of the radio tags 2A to 2C from the communication area 50 can also be detected in the same manner as the approach detection of the radio tags 2A to 2C. While, in the first embodiment, a response to the search signal has been described by way of example and without limitation, any signal can be used so long as the signal includes a frame with a data field storing a command to the radio tags 2A to 2C to reduce the transmission rate temporarily at the time of response. In the claims, the search signal includes such signals.

According to the first embodiment, detection of radio tags is performed with a radio signal communicated between the radio tags 2A to 2C, and therefore, the presence of the radio tags 2A to 2C in the communication area 50 can be determined autonomously. Besides, it is not necessary to use an extra detector that detects the items attached with the radio tags 2A to 2C, for example, by an optical method. According to conventional techniques, if setting of the communication frequency band of the radio-tag reader 3 or the range of the communication area 50 is changed, the detection area of the detector also needs to be changed. In the first embodiment, however, there is no need to change the detection area of the detector because the detector is not necessary. Further, elimination of the need for the detector simplifies the configuration of the radio-tag reader 3, thereby contributing in space saving and reduction of the production cost. Upon detection, by the radio-tag detection processor 33 in the radio-tag reader 3, that radio tags have entered the communication area 50, the radio-tag information communication processor 34 starts reading the radio tags. Accordingly, the reading of the radio tags 2A to 2C can be performed swiftly, which prevents a significant time loss and a decrease in the read rate of the radio tags.

Moreover, the radio-tag reader 3 sends the search signal at predetermined time intervals, and the radio tags having received the search signal transmit the response signals while reducing the transmission rate thereof. Therefore, even when there is a difference in distance between the radio-tag reader 3 and the radio tags 2A to 2C, the response signals from the radio tags 2A to 2C can be received pseudo-synchronously. As a result, it can be determined whether the radio tags 2A to 2C have entered the communication area 50 of the radio-tag reader 3.

Second Embodiment

In the first embodiment, the radio tags reduce the transmission rate of the response signal to the search signal to thereby enable the detection of the radio tags entering altogether into the communication area, and the process thereafter such as reading of the radio tags is performed swiftly. In a second embodiment, a radio-tag reading system is explained in which a priority is assigned to a plurality of radio tags to enable the detection of the radio tags entering altogether into a communication area and swift process thereafter such as reading of the radio tags.

Figure 5:
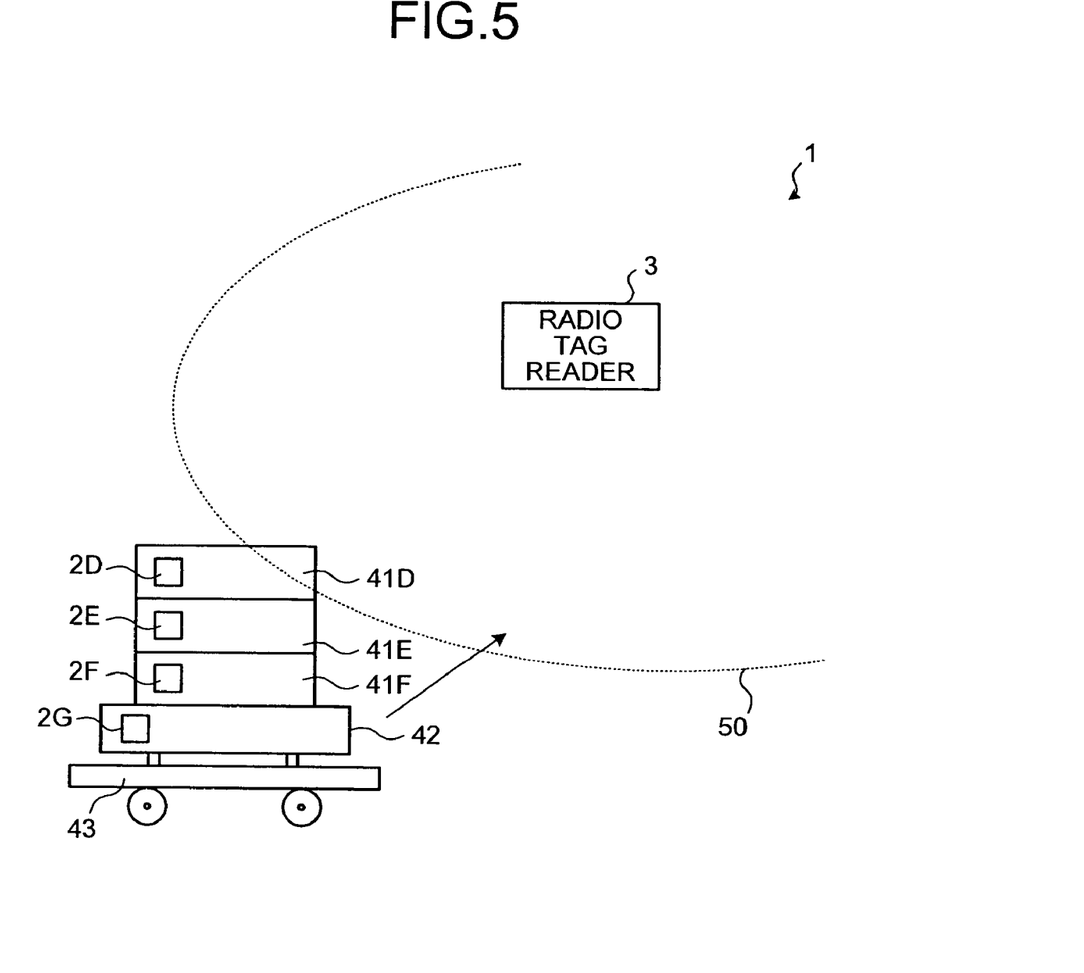
FIG. 5 is a schematic of one example of a configuration of a radio-tag reading system according to a second embodiment of the present invention.

FIG. 5 is a schematic of one example to which the radio-tag reading system according to the second embodiment of the present invention is applied. The radio-tag reading system 1 includes radio tags 2D to 2G having priority information indicating the priority in communication with the radio-tag reader 3, and the radio-tag reader 3 that detects the entrance of the radio tags 2D to 2G into the communication area 50, and perform a predetermined process. Priorities are assigned to the respective radio tags 2D to 2G, and it is assumed herein that only the radio tag 2G has a priority higher than those of the other radio tags 2D to 2F. That is, the group of the radio tags 2D to 2G is constituted of the one radio tag 2G with a high priority and the radio tags 2D to 2F with a lower priority than that of the radio tag 2G. The second embodiment can also be favorably applied to manage incoming and outgoing items in a shop, as in the case, for example, where boxes 41D to 41F that contains items or products attached with the radio tags 2D to 2F with a low priority are loaded on the pallet 42 attached with the radio tag 2G with a high priority, and the radio tags 2D to 2G enter altogether into the communication area 50.

The radio tags 2D to 2G also includes the radio-tag information storage unit 23 shown in FIG. 1 of the first embodiment, which further stores therein priority information indicating the priority of the radio tags 2D to 2G. In the second embodiment, the response processor 22 compares the priority information of the own radio tag with a priority value contained in the frame of the search signal from the radio-tag reader 3, and performs the response process based on the comparison result. The second embodiment is explained on the assumption that the response processor 22 does not reduce the response speed differently from the first embodiment. Otherwise, the radio tag of the second embodiment is similar in configuration to that of the first embodiment, and the detailed explanation thereof is not repeated.

The radio-tag reader 3 has basically the same configuration as that of the first embodiment shown in FIG. 1. A difference from the first embodiment is in that the radio-tag detection processor 33 detects the entrance of a radio tag with the highest priority into the communication area 50 based on the priority information added to respective radio tags, and the radio-tag information communication processor 34 reads the radio tags in decreasing order of priority after the radio-tag detection processor 33 has detected the entrance of the radio tag with the highest priority. Specifically, the radio-tag detection processor 33 first detects the radio tag 2G with the highest priority from a group of the radio tags 2D to 2G, and upon detection of the radio tag 2G with the highest priority, the radio-tag information communication processor 34 first reads the radio tag information from the radio tag 2G, and thereafter, starts to read the radio tags 2D to 2F with a lower priority than that of the radio tag 2G. Otherwise, the radio-tag reader of the second embodiment is similar in configuration to that of the first embodiment, and the detailed explanation thereof is not repeated.

Figure 6:
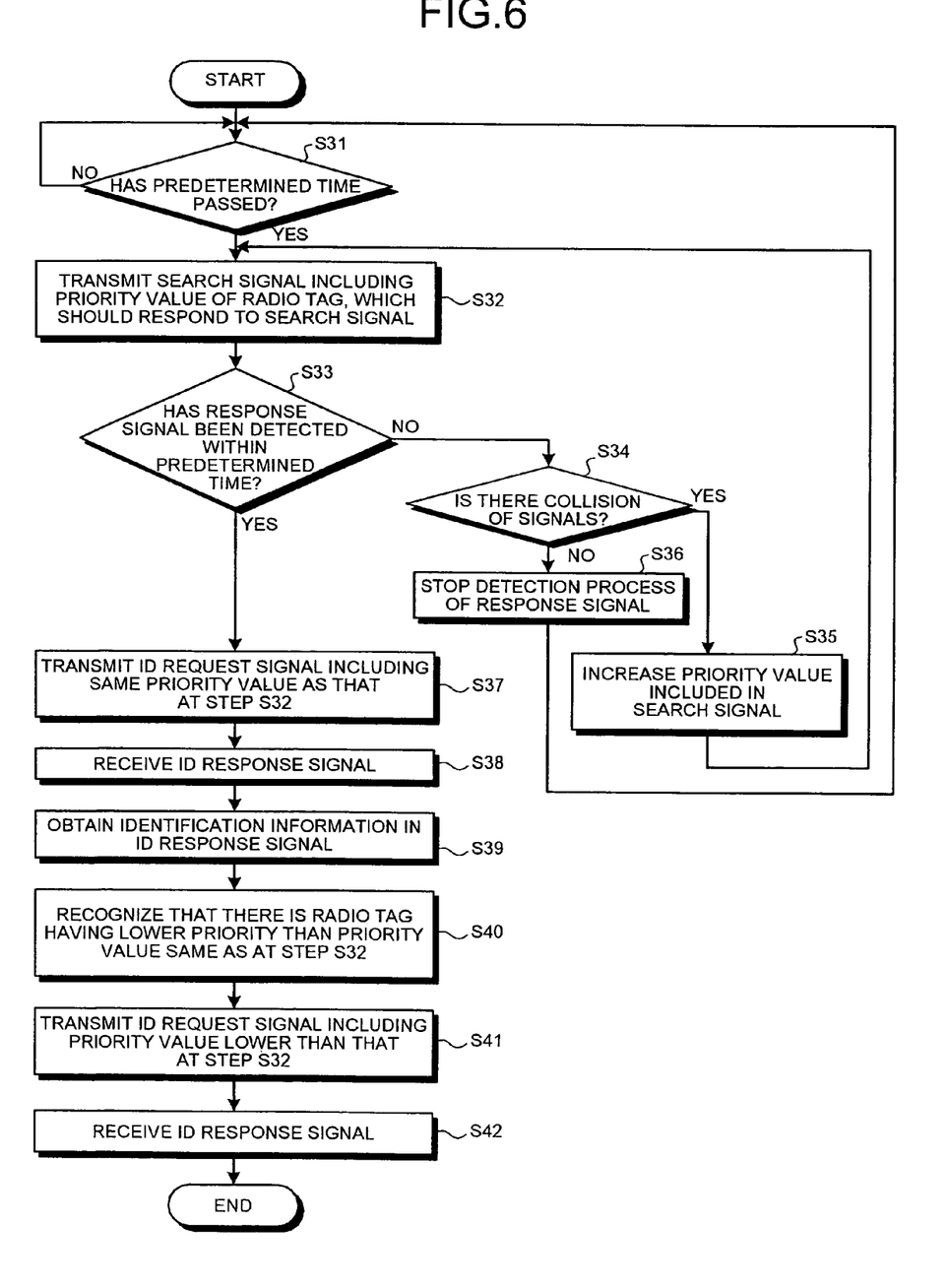
FIG. 6 is a flowchart of a radio-tag detection process and a radio-tag read process performed by a radio-tag reader according to the present invention.
Figure 7:
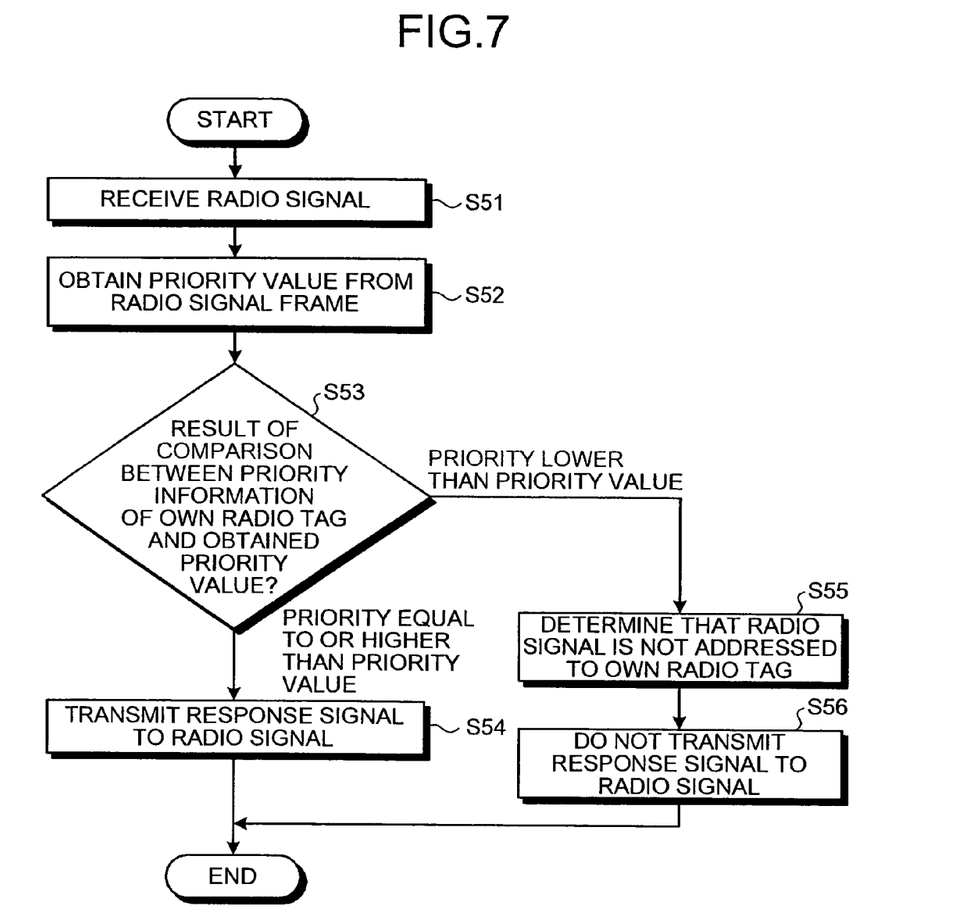
FIG. 7 is a flowchart of a response process for the search signal performed by the radio tag.
Figure 8:
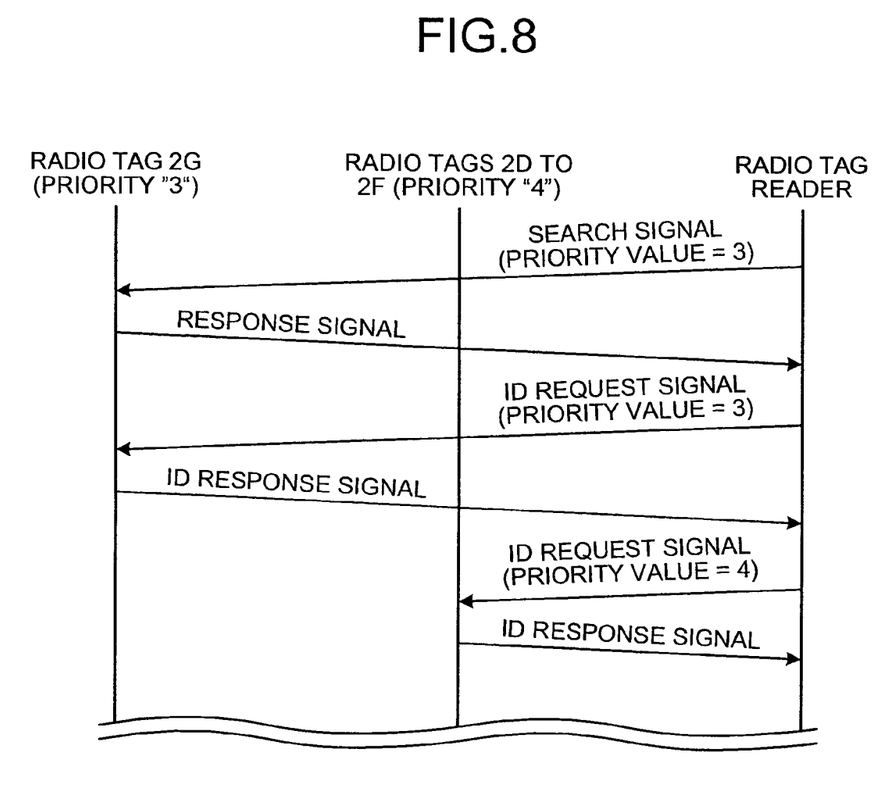
FIG. 8 is a sequence diagram of the radio-tag detection process in the radio-tag reading system according to the second embodiment of the present invention.

An process of detecting that the radio tags 2D to 2G enter the communication area 50 and a radio-tag information read process using the priority assigned to the radio tags 2D to 2G are explained next. FIG. 6 is a flowchart of the radio-tag detection process and the radio-tag read process performed by the radio-tag reader according to the present invention. FIG. 7 is a flowchart of a response process for the search signal performed by the radio tag. FIG. 8 is a sequence diagram of the radio-tag detection process in the radio-tag reading system according to the second embodiment of the present invention. It is assumed herein that the radio tag 2G is assigned with a priority of "3", and the radio tags 2D to 2F are assigned with a priority of "4". The smaller number indicates the higher priority. That is, the priority "3" of the radio tag 2G is higher than the priority "4" of the radio tags 2D to 2F.

Figure 9:
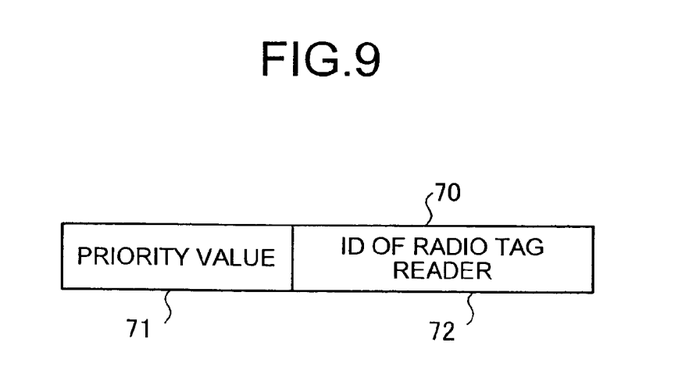
FIG. 9 is one example of a frame structure of a search signal transmitted by the radio-tag reader.

First, when the radio-tag detection process is started by the radio-tag reader 3, the radio-tag detection processor 33 determines whether a predetermined time has passed (step S31). If the predetermined has not passed (No at step S31), the radio-tag detection processor 33 enters standby mode. When the predetermined time has passed (Yes at step S31), the radio-tag detection processor 33 generates a search signal in which the priority (for example, "4") of the radio tag, which is required to respond to the search signal, is stored in the field of the priority value, and transmits the search signal via the communication unit 31 (step S32). The priority of the radio tag, which is required to respond to the search signal, can be arbitrary set from priorities held in the radio-tag reader 3. Incidentally, it is assumed that the search signal does not include a field for a command instructing about the transmission rate of the response signal differently from the first embodiment. FIG. 9 is one example of a frame structure of the search signal transmitted by the radio-tag reader. As shown in FIG. 9, a search signal frame 70 includes a priority value 71 for restricting the radio tag which is required to respond to the search signal, and identification information 72 of the radio-tag reader 3 that transmits the search signal. It is assumed herein that "4" is stored as the priority value.

While the respective radio tags 2D to 2G receive the search signal, the process performed by them is different according to the type of the priority information stored in the radio tags 2D to 2G. As shown in FIG. 7, in the radio tags 2D to 2G, upon receiving the search signal from the radio-tag reader 3 by the communication unit 21 (step S51), the response processor 22 obtains the priority value from the search signal frame (step S52). The response processor 22 then compares the priority information of the own radio tag (2D to 2G) with the priority value obtained from the search signal frame (step S53). When the priority information of the own radio tag (2D to 2G) has a priority equal to or higher than the priority value in the search signal frame (priority equal to or higher than priority value at step S53), the radio tag transmits a response signal to the search signal from the communication unit 21 (step S54), and the process ends. On the other hand, when the priority information of the own radio tag (2D to 2G) has a priority lower than the priority value in the search signal frame (priority lower than priority value at step S53), the response processor 22 determines that the search signal is not addressed to the own radio tag (step S55), and terminates the process without transmitting a response signal to the search signal (step S56). Incidentally, FIG. 7 illustrates a process in which general radio signals, not limited to the search signal, are transmitted to the radio tags 2D to 2G. At step S53 in FIG. 7, determination is made as to whether the priority information set in the respective radio tags 2D to 2G is equal to or higher than the priority value set in the radio signal. However, determination can be made as to whether the priority information of the respective radio tags 2D to 2G is equal to the priority value set in the radio signal, so that response is made only when the priority information is equal to the priority value set in the radio signal. Thus, according to the priority of the radio tags 2D to 2G, response to the received search signal changes.

Thereafter, the radio-tag detection processor 33 in the radio-tag reader 3 determines whether the response signal from each of the radio tags 2D to 2G has been received within a predetermined time since the transmission of the search signal (step S33). When the response signal is not detected within the predetermined time (No at step S33), it is determined whether the response signal cannot be received due to a collision of signals from a plurality of radio tags (step S34). It can be determined whether there is a collision of signals based on a waveform of the signal received through the communication unit 31 and demodulated by the modulator/demodulator 32. When there is no collision of signals from the radio tags (No at step S34), it is determined that the radio tag 2 has not entered the communication area 50. Then, the detection of the response signal is terminated (step S36), and the process returns to step S31. When there is a collision of signals from the radio tags (Yes at step S34), the radio-tag detection processor 33 increases the priority value contained in the search signal (step S35). The process returns to step S32, and the search signal containing the increased priority value is transmitted. In the case of the example shown in FIG. 5, because the priority value is set to "4" in the initial search signal, all the radio tag 2G attached to the pallet 42 and the radio tags 2D to 2F attached to the boxes 41D to 41F, which have a priority equal to or higher than the priority value, return the response signals. Therefore, the radio-tag reader 3 cannot detect the response signal. Accordingly, the radio-tag detection processor 33 resets the priority value to "3", and repeats the process from step S32.

On the other hand, when the response signal from the radio tag 2 is detected within the predetermined time at step S33 (Yes at step S33), the radio-tag detection processor 33 determines that the radio tag 2G enters the communication area 50 and outputs a signal indicating start of reading the radio tag information to the radio-tag information communication processor 34. In the case of the example shown in FIG. 5, as a result of second transmission of the search signal in which the priority value is set to "3", the response signal is received from only the radio tag 2G with the higher priority attached to the pallet 42. Accordingly, the radio-tag detection processor 33 can detect the presence of the radio tag. Thus, the radio-tag information communication processor 34 transmits an ID request signal to the radio tag 2G (step S37). An ID request signal frame also includes a field indicating the priority value as with the search signal frame, and the same priority value as that of the search signal transmitted at step S32 is set. When, however, the search signal has been transmitted a plurality of times, the last priority value is increased at step S37, and the priority value reset in the search signal at step S32 is set. That is, in this example, "3" is set in the priority field of the ID request signal frame.

The radio tag 2G having received the ID request signal containing the priority value equal to the priority information thereof performs the same process as described in connection with FIG. 7, and transmits an ID response signal containing the identification information of the radio tag 2G. The radio-tag reader 3 receives the ID response signal from the radio tag 2G (step S38). While the radio tags 2D to 2F also receive the ID request signal in this case, the radio tags 2D to 2F do not respond to the ID request signal because the priority thereof is lower than the priority value. The radio-tag information communication processor 34 obtains the identification information from the received ID response signal (step S39). Accordingly, the radio-tag information communication processor 34 recognizes that the object (the pallet 42) having the radio tag 2G can hold one or more objects (boxes 41A to 41C) attached with the radio tags 2D to 2F with a lower priority (step S40). For example, as shown in FIG. 5, the radio tag 2G attached to the pallet 42 has a priority higher than that of the radio tags 2D to 2F attached to the boxes 41D to 41F, and the pallet 42 can hold and transport the boxes 41D to 41F. Thus, the radio-tag information communication processor 34 recognizes that the pallet 42 attached with the radio tag 2G can be accompanied by one or more objects (in this case, the boxes 41D to 41F) attached with the radio tags 2D to 2F with a lower priority. This determination can be made by inserting information indicating a type of an object attached with the radio tag 2G in the identification information of the radio tag 2G, and reading the identification information. Or else, a correspondence table between the identification information and the type of the object attached with the radio tag 2G can be prepared beforehand, and the type of the object attached with the radio tag 2G can be identified based on the correspondence table.

Thereafter, the radio-tag information communication processor 34 prepares a priority field in which a priority value lower than the priority used for the radio tag 2G at step 32 is set for the radio tags 2D to 2F, and transmits an ID request signal to the radio tags 2D to 2F using a control method such as the slot-aloha (step S41). It is assumed herein that "4" is set as the priority value. The radio tags 2D to 2F perform the same process as described in connection with FIG. 7, and checks the priority value contained in the ID request signal frame. Having determined that the priority value corresponds to the priority of the own radio tag (2D to 2F), the radio tag (2D to 2F) transmits an ID response signal according to the control method such as the slot-aloha. As a result, the radio-tag information communication processor 34 receives the ID response signal from the radio tags 2D to 2F (step S42). The detection process and the read process of the radio tags 2D to 2G end.

FIG. 8 depicts the above process, in a sequence diagram, as an overall process flow of the system shown in FIG. 5. As shown in FIG. 8, the radio-tag reader 3 determines whether the radio tag 2G with a high priority enters the communication area 50. When the radio tag 2G enters the communication area 50, the radio-tag reader 3 requests identification information of the radio tag 2G. Only when having determined from the identification information that the radio tag 2G can hold objects attached with the radio tags 2D to 2F with a low priority, the radio-tag reader 3 determines that there are the other radio tags 2D to 2F with a lower priority accompanying the radio tag 2G. The radio-tag reader 3 then requests identification information to the radio tags 2D to 2F with a low priority, and reads the radio tag information of them individually.

The second embodiment is explained with an example of arrangement of the radio tags shown in FIG. 5. However, the objects attached with the radio tags are not limited to the boxes 41D to 41F and the pallet 42 so long as the radio tags include the one radio tag 2G with a high priority and the plurality of radio tags 2D to 2F with a lower priority as shown in FIG. 5.

In the above explanation, it is assumed that the priority of the radio tags 2D to 2F and the radio tag 2G is known beforehand. However, the second embodiment can also be realized by previously writing the priority information corresponding to the priority of the radio tags 2D to 2F to the radio-tag information storage unit 23 of the radio tag with a higher priority, i.e., the radio tag 2G.

In FIG. 8, the radio-tag reader 3 detects the entrance of the radio tag 2G by transmitting a search signal. However, in the second embodiment, the signal used for detection is not necessarily the search signal and any signal can be used so long as containing a priority value for the radio tags 2D to 2G, which are to respond to the signal. The type of the signal to be transmitted is not especially limited.

The priority in the second embodiment indicates the fixed identification information (ID) in the radio tag, and, in the case of an example shown in FIG. 5, existing identification information (ID) that uniquely identifies each radio tag or a part thereof can be used. The second embodiment is not limited to particularly adding the identification information such as the priority information. When the radio tag includes a writable radio-tag information storage unit, the priority information can be stored additionally therein to realize the radio-tag reading system 1 according to the present invention.

In the second embodiment, there are two orders of priority. However, the number of orders of priority is cited merely by way of example and without limitation. When there are a plurality of orders of priority and the priority of the radio tag entering the communication area is unclear, the radio-tag detection processor can scan the priority by repeatedly transmitting the search signal while changing the priority value until a response signal to the search signal is received properly, thereby detecting the entrance of the radio tag. Besides, the second embodiment can be implemented in combination with the first embodiment.

As in the first embodiment, an example in which the radio tags 2D to 2G enter the communication area is explained. However, the present invention is also applicable to detect the plurality of radio tags 2D to 2G exit from the communication area 50 in the same manner as the approach detection of the radio tags 2D to 2G.

According to the second embodiment, the entrance of a radio tag group can be detected and start of communication with the radio tags 2D to 2G can be determined by assigning a priority to the radio tags 2D to 2G without any change in the radio tags 2D to 2G and the modulator/demodulator 32 in the radio-tag reader 3. Moreover, the radio-tag reader 3 need not acquire the priority of the radio tags 2 entering the communication area 50 beforehand to set a priority value that precisely matches the priority of the entering radio tags. In other words, when response signals to the search signal containing a certain priority value collide with each other, the search signal is transmitted repeatedly while the priority value is increased until the response signals do not collide with each other to detect the radio tag 2 entering the communication area 50. As a result, even when a group of radio tags 2 with different priorities enter the communication area 50, the radio-tag reader 3 can handle the situation.

INDUSTRIAL APPLICABILITY

As described above, the present invention is suitably applied to a radio-tag reading system that detects a group of radio tags enter into or exit from a communication area of a radio-tag reader at a time.

The invention claimed is:

1. A radio-tag reading system comprising:
a plurality of radio tags each configured to be attached to an object and stores therein respective radio tag information, the respective radio tag information being predetermined information on the object; and
a radio-tag reader that reads the respective radio tag information from each radio tag, and includes:
   a communicating unit that performs radio communication with each radio tag;
   a radio-tag detecting unit that transmits via the communicating unit a search signal at predetermined time intervals, the search signal having a field that includes a command to one or more radio tags in the communication area to each transmit a response signal according to a predetermined condition, and wherein the radio-tag detecting unit detects at least one of movement of the one or more radio tags into and out of the communication area where radio communication is available through the communicating unit based on the response signals transmitted from the one or more radio tags satisfying the predetermined condition to the search signal; and
   a radio-tag information processing unit that responsive to detecting said at least one of movement of the one or more radio tags into and out of the communication area, reads the respective radio tag information from the one or more radio tags upon receiving the response signals from the one or more radio tags according to said predetermined condition;
wherein the radio-tag detecting unit generates the search signal that includes the command to reduce a transmission rate of the response signals from the one or more radio tags by a predetermined percentage, and one or more responding units of the one or more radio tags transmit the response signals while reducing the transmission rate by the predetermined percentage based on the command.

2. The radio-tag reading system according to claim 1, wherein the radio tag includes a plurality of radio tags.

3. The radio-tag reading system according to claim 2, wherein each radio tag further stores therein priority information indicating priority among the radio tags, the radio-tag detecting unit generates the search signal that includes a priority value specifying a priority of a radio tag which is required to respond to the search signal, and the radio-tag information processing unit reads the radio tag information from the one or more radio tags in decreasing order of priority upon receiving response signals from the one or more radio tags, and the responding unit compares, upon receiving the search signal from the radio-tag reader, the priorty value contained in the search signal with the priorty information, and transmits a response signal in response to the search signal when a predetermined condition is satisfied.

4. The radio-tag reading system according to claim 3, wherein the radio tags include a first radio tag with a high priority and a plurality of second radio tags with a priority lower than that of the first radio tag, and the radio-tag detecting unit sets the priority value that specifies the priority of the first radio tag.

5. The radio-tag reading system according to claim 3, wherein the radio-tag detecting unit transmits the search signal while changing the priority value until a response signal is received.

6. The radio-tag reading system according to claim 3, wherein the priority information is information that uniquely identifies the radio tag.

7. A radio-tag reader that performs radio communication with a plurality of radio tags each attached to an object, and reads respective radio tag information from the radio tags, the respective radio tag information being predetermined information on the objects stored in the radio tags, the radio-tag reader comprising:

a communicating unit that performs radio communication with each radio tag;

a radio-tag detecting unit that transmits via the communicating unit a search signal at predetermined time intervals, the search signal having a field that includes a command to one or more radio tags in a communication area to each transmit a response signal according to a predetermined condition, and wherein the radio-tag detecting unit detects at least one of movement of the one or more radio tags into and out of the communication area where radio communication is available through the communicating unit based on the response signals transmitted from the one or more radio tags satisfying the predetermined condition; and a radio-tag information processing unit that responsive to detecting said at least one of movement of the one or more radio tags into and out of the communication area, reads the respective radio tag information from the one or more radio tags upon receiving the response signals from the one or more radio tags according to said predetermined condition;

wherein the radio-tag detecting unit generates the search signal that includes a command to reduce a transmission rate of the response signals from the one or more radio tags by a predetermined percentage.

8. The radio-tag reader according to claim 7, wherein the radio-tag detecting unit generates the search signal that includes a priority value specifying a priority of each radio tag which is required to respond to the search signal, and the radio-tag information processing unit reads the radio tag information from the one or more radio tags in decreasing order of priority upon receiving response signals from the one or more radio tags.

9. The radio-tag reader according to claim 8, wherein the radio tag includes a first radio tag with a high priority and a plurality of second radio tags with a priority lower than that of the first radio tag, and the radio-tag detecting unit sets the priority value that specifies the priority of the first radio tag.

10. The radio-tag reader according to claim 9, wherein the radio-tag detecting unit transmits the search signal while changing the priority value until a response signal is received.

11. A method of reading a plurality of radio tags each configured to be attached to an object and stores therein respective radio tag information, the respective radio tag information being predetermined information on the object, the method comprising:

reading the radio tag information from the radio tags by:

performing, by utilizing a communication unit, radio communication with the radio tags;

transmitting via the communicating unit a search signal at predetermined time intervals, the search signal having a field that includes a command to one or more radio tags in a communication area to each transmit a response signal according to a predetermined condition;

detecting at least one of movement of the one or more radio tags into and out of the communication area where radio communication is available through the communicating unit based on the respective response signal transmitted from the one or more radio tags satisfying the predetermined condition; and reading, responsive to detecting said at least one of movement of the one or more radio tags into and out of the communication area, the respective radio tag information from the one or more radio tags upon receiving the response signals from the one or more radio tags;

wherein generating the search signal that includes the command to reduce a transmission rate of the response signals from the one or more radio tags by a predetermined percentage, and one or more responding units of the one or more radio tags transmit the response signals while reducing the transmission rate by the predetermined percentage based on the command.

12. The method of reading a radio-tag according to claim 11, wherein the radio tag includes a plurality of radio tags.

13. The method of reading a radio-tag according to claim 12, wherein the radio tag further stores therein priority information indicating priority among the radio tags, and the method of reading the radio-tag further comprising:

generating the search signal that includes a priority value specifying a priority of each radio tag which is required to respond to the search signal, and reading the radio tag information from the one or more radio tags in decreasing order of priority upon receiving response signals from the one or more radio tags, and comparing, upon receiving the search signal from the radio-tag reader, the priority value contained in the search signal with the priority information, and transmitting a response signal in response to the search signal when a predetermined condition is satisfied.

14. The method of reading a radio-tag according to claim 13, wherein the radio tags include a first radio tag with a high priority and a plurality of second radio tags with a priority lower than that of the first radio tag, and the method of reading the radio-tag further comprising:

setting the priority value that specifies the priority of the first radio tag.

15. The method of reading a radio-tag according to claim 13, further comprising:

transmitting the search signal while changing the priority value until a response signal is received.

16. The method of reading a radio-tag according to claim 13, wherein the priority information is information that uniquely identifies the radio tag.

17. A method of performing radio communication with a plurality of radio tag each attached to an object, the method comprising:

reading respective radio tag information from each radio tag, the respective radio tag information being predetermined information on the object stored in each radio tag by;

performing, by utilizing a communication unit, radio communication with each radio tag;

transmitting via the communicating unit a search signal at predetermined time intervals, the search signal having a field that includes a command to one or more radio tags in a communication area to each transmit a response signal according to a predetermined condition;

detecting at least one of movement of the one or more radio tags into and out of the communication area where radio communication is available through the communicating unit based on the response signal transmitted from one or more radio tags satisfying the predetermined condition; and reading, responsive to detecting said at least one of movement of the one or more radio tags into and out of the communication area, the respective radio tag information from the one or more radio tags upon receiving the response signals from the one or more radio tags;

wherein generating the search signal that includes the command to reduce a transmission rate of the response signals from the one or more radio tags by a predetermined percentage.

18. The method of performing radio communication according to claim 17, further comprising:

generating the search signal that includes a priority value specifying a priority of each radio tag which is required to respond to the search signal, and reading the radio tag information from the one or more radio tags in decreasing order of priority upon receiving response signals from the one or more radio tags.

19. The method of performing radio communication according to claim 18, wherein the radio tag includes a first radio tag with a high priority and a plurality of second radio tags with a priority lower than that of the first radio tag, and the method further comprising:

setting the priority value that specifies the priority of the first radio tag.

20. The method of performing radio communication according to claim 19, further comprising:

transmitting the search signal while changing the priority value until a response signal is received.

21. The method of performing radio communication according to claim 18, wherein the priority information is information that uniquely identifies the radio tag.

* * * * *